United States Patent [19]

Genov et al.

[11] Patent Number: 5,007,784
[45] Date of Patent: Apr. 16, 1991

[54] DUAL END EFFECTOR ROBOTIC ARM

[75] Inventors: Genco Genov, Sunnyvale; James Cameron, Mountain View, both of Calif.

[73] Assignee: Genmark Automation, Sunnyvale, Calif.

[21] Appl. No.: 410,087

[22] Filed: Sep. 20, 1989

Related U.S. Application Data

[63] Continuation-in-part of Ser. No. 299,754, Jan. 20, 1989.

[51] Int. Cl.⁵ ............................................. B25J 9/06
[52] U.S. Cl. .................................. 414/225; 414/461; 414/744.6; 414/786; 198/471.1; 198/476.1
[58] Field of Search ............... 414/225, 744.5, 744.6, 414/217, 416, 736, 737, 752, 786; 901/6, 15, 21, 40; 74/479; 198/471.1, 474.1

[56] References Cited

U.S. PATENT DOCUMENTS

| 3,968,885 | 7/1976 | Hassan et al. | 414/217 X |
| 4,299,533 | 11/1981 | Ohnaka | 414/752 |
| 4,501,527 | 2/1985 | Jacoby et al. | 414/225 |
| 4,735,539 | 4/1988 | Hakkinen et al. | 414/737 X |
| 4,746,256 | 5/1988 | Boyle et al. | 414/217 |

Primary Examiner—David A. Bucci
Assistant Examiner—Donald W. Underwood
Attorney, Agent, or Firm—Fliesler, Dubb, Meyer & Lovejoy

[57] ABSTRACT

A robotic arm comprises a plurality of sequentially pivotally attached links. The proximal end portion of the proximalmost of the links is pivotally mounted to a relatively static structure. An end effector structure has two substantially oppositely extending hands each capable of picking up a workpiece. The end effector structure is centrally pivotally mounted to the distal end portion of the distalmost link. The links, end effector structure and static structure are such as to allow the robotic arm to reverse across the pivot axis of the proximal end portion of the proximalmost of the links. A radial drive serves for driving the links in a manner such that the pivot axis of the central portion of the end effector structure moves only substantially linearly radially along a straight line passing through and perpendicular to the pivot axis of the proximal end portion of the proximalmost of the links and to the pivot axis of the central portion of the end effector structure. The effector structure is maintained at a selected angle to the line. A rotational drive rotates the relatively static structure and with it the links about the pivot axis of the proximal end portion of the proximalmost of the links.

11 Claims, 3 Drawing Sheets

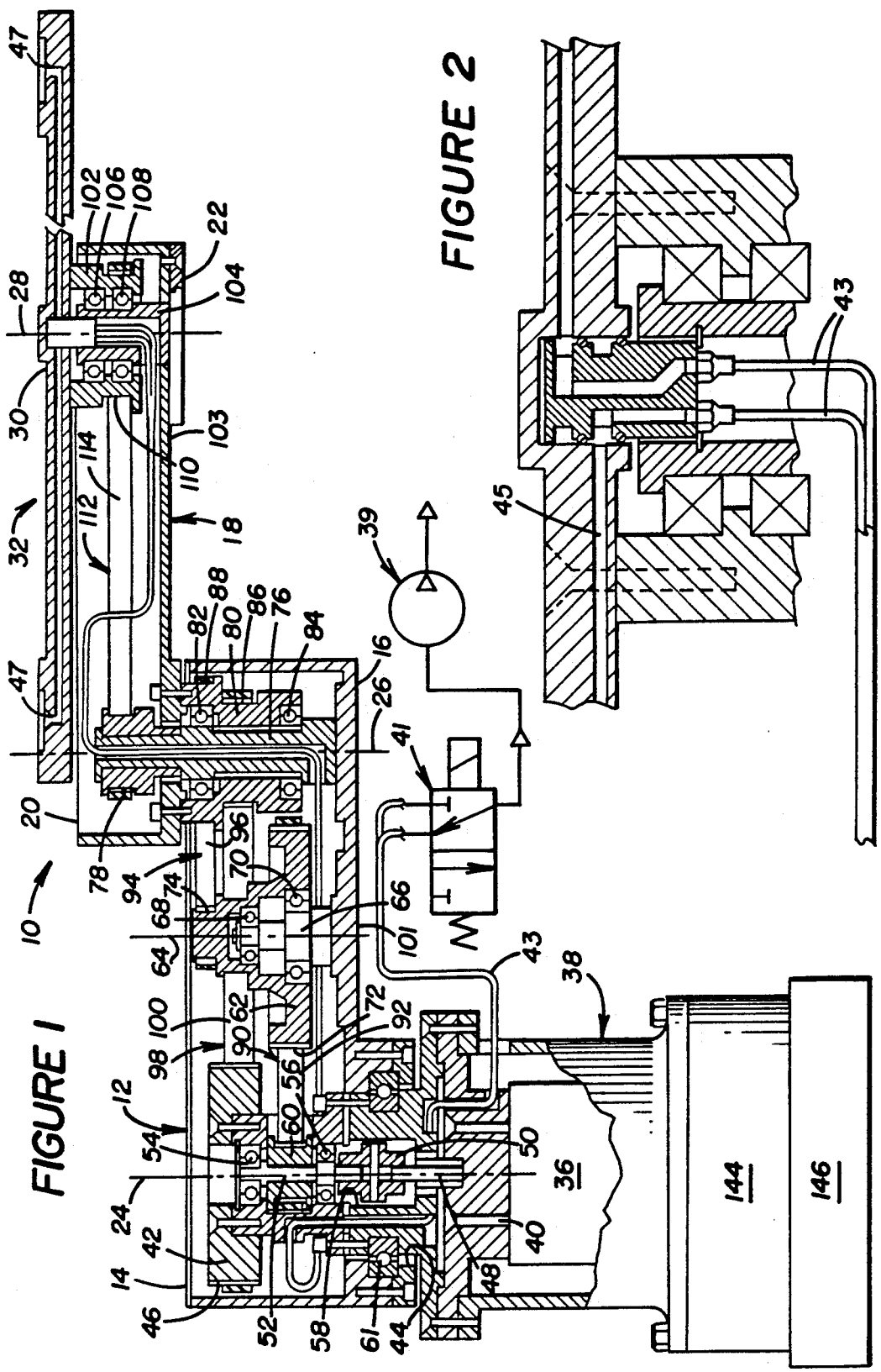

DUAL END EFFECTOR ROBOTIC ARM

CROSS-REFERENCE

This application is a continuation-in-part of copending application Ser. No. 07/299,754 filed Jan. 20, 1989, pending.

TECHNICAL FIELD

The present invention relates to a precision arm mechanism which will extend and retract in a straight line and is suitable for positioning various objects such as semiconductor wafers, computer hard discs, and the like for processing and/or use.

BACKGROUND OF THE INVENTION

The use of robot arms for positioning and placing objects is well known. Generally, the arms have Z, r and motion in a conventional cylindrical coordinate system. The r or straight line movement of the end effector or mechanical hand at the end of the arm has been accomplished in a number of manners. For example, telescoping arms have been utilized for this purpose.

United Kingdom Patent Application GB 2193482A, published Feb. 10, 1988 and claiming priority from U.S. Pat. application Ser. No. 856,749 filed Aug. 5, 1986 discloses a wafer handling arm which includes two unequal length links with the distal end of one link being pivotally attached to the proximal end of the other link, with the hand being integral with the distal end of the distal link and which utilizes a belt drive which is fixed to a cam to attain nearly straight line motion.

It is also known to utilize an isosceles triangle type linkage wherein two equal length links are pivoted together and a mechanical hand is pivoted to the distal end of the distal link. Pulleys and belts are utilized in such a manner that the angle between the two links changes at twice the rate as do the angles that each of the links makes with a line connecting the points about which their other ends are pivoted. This linkage provides drive directly from a motor shaft to the proximal end portion of the proximal link. A belt about a stationary pulley coaxial with the motor shaft passes about a pulley at the point of pivoting of the two links to one another. Another pulley and belt arrangement provides pivoting of another pulley where the second link is pivotally connected to the mechanical hand.

In another apparatus a pair of isoceles triangle type linkages face one another and the mechanical hand is pivotally attached to the distal ends of both of the distal links. The proximal ends of each of the proximal links is driven in an opposite direction of rotation by a single rotating motor shaft, generally through use of appropriate gearing. What results is a frogs leg type of motion with each isoceles triangle type linkage serving as means for controlling the other such linkage in such a manner that the angles between the two links of each of the isosceles triangle linkages changes at twice the rate as do the angles that each of the links makes with a line connecting the points about which their other ends are pivoted.

In copending application Ser. No. 07/299,754 an arm structure is disclosed comprising first and second longitudinally extending links each having proximal and distal end portions, the second longitudinally extending link being twice the effective length of the first link and the proximal end portion of the second link being pivotally mounted to the distal end portion of the first link about a first pivot axis. A third longitudinally extending link is equal in effective length to the first link, the third link having proximal and distal end portions. The proximal end portion of the third link is rotatably mounted about a third pivot axis to the distal end portion of the second link. An end effector is pivotally mounted to the distal end portion of the third link for rotation about a fourth pivot axis. Means is provided for coordinatedly rotating the first link, the second link, the third link and the end effector at a rotation ratio of the first axis to the second axis to the third axis to the fourth axis of 1:2:2:1.

There is a problem which is common to all of the above described radial positioning arms. This problem is that the arms must sit idly by while a workpiece is being worked upon. For example, a semiconductor wafer is picked up from a loading cassette by an end effector located at the end of the arm. The wafer is moved to a processing station and deposited. The arm moves away and sits idly by until processing at the station is completed. Once the process is completed the single end effector must move into the processing chamber, pick up the processed wafer and retract, rotate to the receiving cassette, place the processed wafer in the receiving cassette, rotate to the loading cassette, move in and pick up another wafer, retract, rotate back to the processing chamber, place the wafer and retract again to wait for the process to be finished. This is a total of eleven movements, and the time these movements take limits the throughput, i.e., the number of eleven pieces which can be processed in a given time.

The present invention is directed to overcoming one or more of the problems as set forth above.

DISCLOSURE OF THE INVENTION

In accordance with an embodiment of the present application a robotic arm is set forth. It comprises a plurality of sequentially pivotally attached links each having proximal and distal end portions, with the proximal end portion of each link except a proximalmost of the links being pivotally attached relative to the distal end portion of the preceding link. A relatively static structure is provided to which the proximal end portion of the proximalmost of the links is pivotally mounted. An end effector structure has a central portion and two substantially oppositely extending hands each capable of picking up a workpiece, the central portion being centrally pivotally mounted to the distal end portion of a distalmost of the links. The links, end effector structure and static structure are of a construction sufficient to allow the robotic arm to reverse across the pivot axis of the proximal end portion of the proximalmost of the links. Radial drive means is present for driving the links in a manner such that the pivot axis of the central portion of the end effector structure moves only substantially linearly radially along a straight line passing through and perpendicular to the pivot axis of the proximal end portion of the proximalmost of the links and to the pivot axis of the central portion of the end effector structure and the effector structure is maintained at a selected angle to the line. Rotational drive means is present for rotating the relatively static structure and with it the links about the pivot axis of the proximal end portion of the proximalmost of the links.

In accordance with another embodiment of the invention a workpiece processing apparatus is set forth. It comprises a workpiece holder adapted to hold a plurality of workpieces to be processed; a work station adapted to hold and process successively held workpieces; and a workpiece receiver adapted to receive successively processed workpieces. A robotic arm is also present which comprises a plurality of sequentially pivotally attached links each having proximal and distal portions, with the proximal end portion of each link except a proximalmost of the links being pivotally attached relative to the distal end portion of the preceding link. A relatively static structure is provided to which the proximal end portion of the proximalmost of the links is pivotally mounted. An end effector structure has a central portion and two substantially oppositely extending hands each capable of picking up a workpiece, the central portion being centrally pivotally mounted to the distal end portion of a distalmost of the links. The links, end effector structure and static structure are of a construction sufficient to allow the links and end effector structure to reverse across the pivot axis of the proximal end portion of the proximalmost of the links. Radial drive means is present for driving the links in a manner such that the pivot axis of the central portion of the end effector structure moves only substantially linearly radially along a line passing through and perpendicular to the pivot axis of the proximal end portion of the proximalmost of the links and to the pivot axis of the central portion of the end effector structure and the end effecture structure is maintained at a selected angle to the line. Rotational drive means is present for rotating the relatively static structure and with it the links about the pivot axis of the proximal end portion of the proximalmost of the links. The robotic arm is positioned and of a construction sufficient to remove successive workpieces from the holder using either of the hands, position the workpieces successively at the work station using either of the hands, remove the workpieces successively from the work station using either of the hands and position the workpieces successively in the receiver using either of the hands.

Another embodiment yet of the invention is its method of processing workpieces. The method comprises picking up an unprocessed workpiece from a workpiece holder in one of two hands of a robotic arm comprising a plurality of sequentially pivotally attached links each having proximal and distal end portions, with the proximal end portion of each link except a proximalmost of the links being pivotally attached to the distal end portion of the preceding link. A relatively static structure is present to which the proximal end portion of the proximalmost of the links is pivotally mounted. An end effector structure has a central portion and two substantially oppositely extending hands each capable of picking up a workpiece, the central portion being centrally pivotally mounted to the distal end portion of a distalmost of the links. The links, end effector structure and static structure are of a construction sufficient to allow the links and end effector structure to reverse across the pivot axis of the proximal end portion of the proximalmost of the links. Radial drive means is present for driving the links in a manner such that the pivot axis of the central portion of the end effector structure moves only substantially linearly radially along a line passing through and perpendicular to the pivot axis of the proximal end portion of the proximalmost of the links and to the pivot axis of the central portion of the end effector structure and the end effector structure is maintained at a selected angle to the line. Rotational drive means is present for rotating the relatively static structure and with it the links about the pivot axis of the proximal end portion of the proximalmost of the links. The unprocessed workpiece is deposited at a work station. The workpiece is processed at the work station to provide a processed workpiece. During the processing another unprocessed workpiece is picked up from the workpiece holder in one of the hands. The empty one of the hands is positioned adjacent the work station in alignment to remove the processed workpiece from it. Following the processing the processed workpiece is removed from said work station. The robotic arm is reversed to position the unprocessed workpiece in alignment for deposit at the work station. The unprocessed workpiece is then deposited at the work station. The processed workpiece is delivered to a workpiece receiver. The "during the processing" and "following the processing" steps above are repeated until a desired number of workpieces have been processed.

The provision of two hands on a centrally pivoted end effector significantly increases wafer throughput capacity. For example, one of the hands can pick up a wafer from a loading cassette and deposit it at a processing station. Then, while the processing is proceeding one or the other of the hands can pick up another wafer from the loading cassette and can move back into position to pick up the wafer then being processed. As soon as the first wafer is finished it can be picked up by the free hand and the arm can be reversed and the second wafer loaded onto the processing station. The first wafer can be deposited in the receiving cassette, a third wafer can be picked up and a free hand can be aligned to pick up the second wafer from the processing station as soon as its processing is completed. This exchange of processed and unprocessed wafers in the processing station now is comprised of a total of five movements (as compared with eleven for the prior art). This can be repeated as often as is necessary. Processing time per wafer is significantly reduced as the processing station is idle for only very short periods of time. Another advantage of the invention is the ability to have two different shaped end effectors on the same robot. This can be useful in cases where more than one process is being serviced by the same robot and where the processing stations require different end effector designs for picking and placing.

BRIEF DESCRIPTION OF DRAWINGS

The invention will be better understood by reference to the figures of the drawings wherein like numbers denote like parts throughout and wherein:

FIG. 1 illustrates, in sectioned elevational view, partially schematically, an arm structure in accordance with an embodiment of the present invention;

FIG. 2 illustrates a detail in the FIG. 1 embodiment;

BEST MODE FOR CARRYING OUT THE INVENTION

Figure 3:
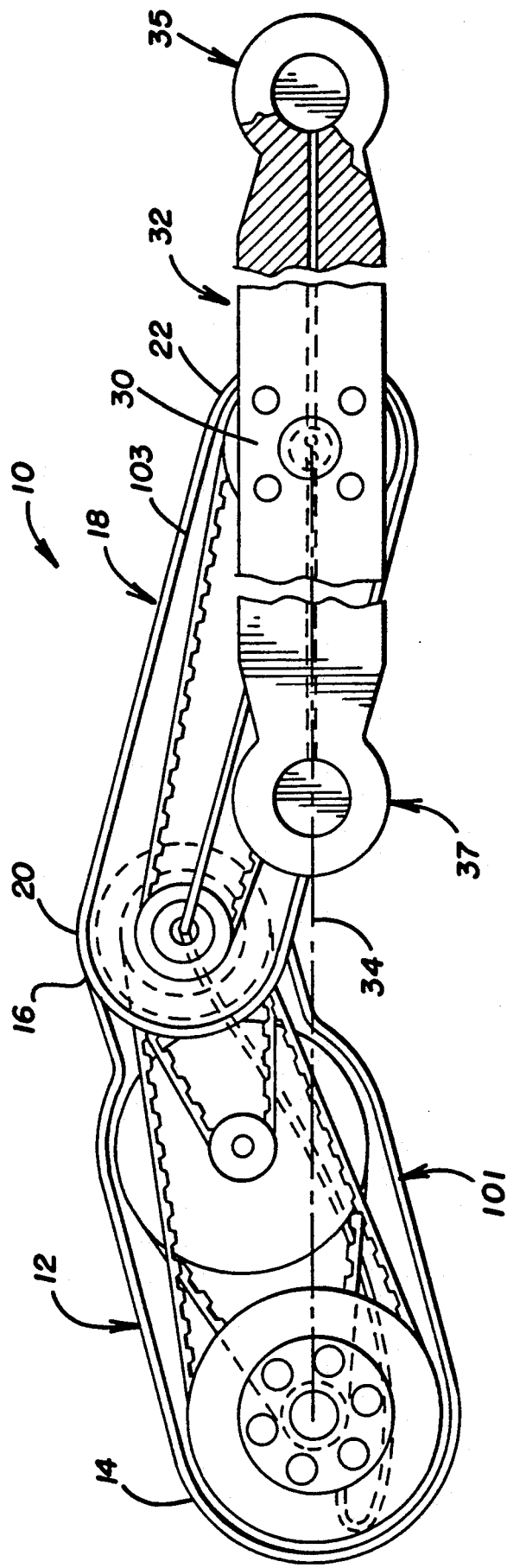
FIG. 3 is a top view of the embodiment of FIG. 1 with the coverings of the links omitted to show the interior.

FIGS. 1 and 2 illustrate one aspect of an embodiment in accordance with the present invention. In each of these figures an arm structure 10 is shown which includes both a first longitudinally extending link 12 having a proximal end portion 14 and a distal end portion 16 and a second longitudinally extending link 18 which is equal in effective length to the first link 12, with the second link 18 also having a proximal end portion 20 and a distal end portion 22. The term effective length is used to indicate that the distance between a first pivot axis 24 where the proximal end 14 of the first link 12 is pivotally mounted as will be explained later, and a second pivot axis 26 where the proximal end portion 20 of the second link 18 is pivotally mounted to the distal end portion 16 of the first link 18, is equal to the distance between the second pivot axis 26 and a third pivot axis 28 where a central portion 30 of a dual mechanical end effector structure 32 is pivotally mounted to the distal end portion 22 of the second link 18. This, along with the requirement as will be discussed later that angular rotation about the second axis 26 be twice that about each of the first axis 24 and the third 28, assures that the dual end effector 32 moves at a selected angle to a line 34 which passes through the first pivot axis 24 and the third pivot axis 28 and is perpendicular to both of these axes. A first end portion or hand 35 and a second end portion or hand 37 of the dual end effector 32 each have means for grasping a workpiece 39 (FIG. 4) such as a silicon wafer or a computer hard disc. In the embodiment illustrated a vacuum source 39, valving 41, lines 43, appropriately placed passages 45 and openings 47 serve as the grasping means. However, mechanical (as opposed to vacuum) grasping means can alternately be used.

The terms proximal and distal as used herein are relative to the first pivot axis 24. The terms cylindrical surface and pulley surface used herein are used to distinguish from those surfaces which are on non-pivoting members (the cylindrical surfaces) and those surfaces which are on pivoting members (the pulley surfaces).

A motor 36 (FIG. 1) is mounted to a relatively static structure 38 via conventional bolts 40. The static structure 38 includes a part 42 which extends upwardly through an opening 44 in the first link 12. The upwardly extending part 42 of the static structure 38 has a first cylindrical surface 46 the use of which will shortly become apparent. A shaft 48 extends upwardly from the motor 36 and may be extended, as illustrated, by using a coupling 50 to attach an extension shaft 52 to the shaft 48. The extension shaft 52 is rotatably mounted at spaced apart bearings 54 and 56 to an interior cavity 58 in the upper portion 42 of the relatively static structure 38. A drive wheel 60 is mounted to the extension shaft 52 and rotates therewith. As will be noted the drive wheel 60 is coaxial with the first cylindrical surface 46. The first link 12 is pivotally mounted to the relatively static structure 38 at a bearing 61.

In accordance with this embodiment of the present invention a first housing 62, which can be of multi-part construction as illustrated, is mounted for rotation about an axis 64 in perpendicular relation to the first link 12 and in parallel relation to the first pivot axis 24, the second pivot axis 26 and the third pivot axis 28 intermediate the proximal end portion 14 and the distal end portion 16 of the first link 12. The first housing 62 is mounted for rotation about the axis 64 by its being mounted to an upstanding member 66 which also has the axis 64 via appropriate spaced apart bearings 68 and 70, as illustrated. The first housing 62 has a first pulley surface 72 and a second pulley surface 74 coaxially on it. The first and second pulley surfaces 72 and 74 are longitudinally spaced from one another along the first housing 62. The first pulley surface 72 is aligned opposite the drive wheel 60, as illustrated.

A post 76 is mounted to the distal end portion 16 of the first link 12 along the second pivot axis 26. The post 76 has a second cylindrical surface 78 on it with the second cylindrical surface 78 being cylindrical about the second pivot axis 26. A second housing 80 is rotatably mounted to the post 76 via the spaced apart bearings 82 and 84 whereby the second housing 80 is rotatable about the second pivot axis 26. The second housing 80 has a third pulley surface 86 aligned opposite the first cylindrical surface 46 and has a fourth pulley surface 88 aligned opposite the second pulley surface 74.

First rotating means 90, as illustrated a first belt 92, serves for applying a rotational force between the drive wheel 60 and the first pulley surface 72. Thus, the first housing 62 is rotated in response to rotation of the drive wheel 60 which is driven by the motor 36. The circumference of the first pulley surface 72 is significantly greater than that of the drive wheel 60, thus providing a reduction of the rate of rotation of the first housing 62 as compared to that of the motor 36. Thus, this provides a first stage of reduction of any jerkiness in, chattering or cogging of the motor 36.

Second rotating means 94, in the embodiment illustrated a second belt 96, serves for applying a rotational force between the second pulley surface 74 and the fourth pulley surface 88 on the second housing 80. The second pulley surface 74 suitably has a smaller circumference, as illustrated, than does the fourth pulley surface 88, whereby a further reduction is provided to reduce the effect of any chattering or cogging in the motor 36.

Third rotating means 98, in the embodiment illustrated a third belt 100, serves for applying a rotational force between the third pulley surface 86 on the second housing 80 and the first cylindrical surface 46. Since the first cylindrical surface 46 is part of the relatively static structure 38 the rotational force applied by the belt 100 results in rotation of the first link 12 about the first pivot axis 24 (at bearing 61). The first cylindrical surface 46 must have a circumferential extension twice that of the third pulley surface 86. This provides the needed 2:1 ratio of change of the angles. It also provides an additional reduction of the motor 36 to further reduce or eliminate any possible chattering or cogging problems. Note that the overall reduction of the linkages is not the simple product of the ratios of the circumferences of the pulleys due to the motion of the second pivot axis 26.

To control any possible problems with chattering and cogging it is suitable to have a reduction from the drive wheel 60 to the first cylindrical surface 46 of at least about 5 to 1, more preferably about 10 to 1. In the particular embodiment illustrated, the reduction is about 14.2 to 1.

It is important to note that driving of rotation of the first link 12 and the second link 18 about the second pivot axis 26 by the drive wheel 60, whether via use of the first housing 62 to transmit power from the drive wheel 60 as illustrated or directly, provides a great advantage in accuracy of placement of the dual end effector structure 32. Note that the rotation of the first link 12 about the first pivot axis 24 is motivated by rotation of the second housing 80 (with which the second link 18 rotates). Thus, the transmission of power is from the second pivot axis 26 to the first pivot axis 24, a distance equal in effective length to the effective length of the first link 12. A similar distance of transmission of power takes place from the second pivot axis 26 to the third pivot axis 28. In neither instance is the power transmitted through a pivot whereat full rigidity is not present. As a result a construction is provided whereby the dual end effector structure 32 can be very accurately controlled and is free from error in placement.

The various moving components i.e., the pivots and belts, can advantageously be enclosed in casings 101 and 103 whereby contamination by particulate debris is prevented.

Referring again to FIGS. 1 and 2 it will be noted that there is a third housing 102 rotatably mounted to the distal end portion 22 of the second link 18 and having as an axis of rotation the third pivot axis 28. The third housing 102 is mounted to a second post 104 which is attached to the distal end portion 22 of the second link 18. The mounting is via appropriate spaced apart bearings 106 and 108. The dual end effector structure 32, more particularly the central portion 30 thereof, is attached to and rotates with the third housing 102. The third housing 102 has a fifth pulley surface 110 which is aligned opposite the second cylindrical surface 78 on the first post 76.

Fourth rotating means 112, in the embodiment illustrated a fourth belt 114, serves for applying a rotational force between the second cylindrical surface 78 and the fifth pulley surface 110. In accordance with the embodiment of FIGS. 1 and 2 the fifth pulley surface 110 has a circumferential extension twice that of the second cylindrical surface 78. In this manner it is assured that rotation about the third pivot axis 28 is one-half that about the second pivot axis 26 whereby the dual end effector structure 32 moves at a selected angle to the line 34 as the third pivot axis 28 moves along the line 34. In most instances the angle will be zero degrees and the dual end effector structure 32 will move along the line 34. In this manner wafers 39 can be positioned in and out of cassettes and/or work stations by linear movement of either end portion or hand, 35 or 37. Note that as the first link 12 swings this moves the second cylindrical surface 78 through an arc thereby providing force transmission via the fourth belt 114 to rotate the third housing 102 and with it the dual end effector structure 32. All motion is controlled by power delivered to the second housing 80 from the first housing 62 in the manner previously discussed. Thus, the dual end effector structure 32 can be very accurately positioned.

Operation should be recognized as being relatively straightforward. As the drive wheel 60 rotates the belt 92 transmits rotation to the first housing 62 which in turn, via the belt 96 causes the second housing 80 to rotate. Rotation of the second housing 80 leads to a force in the third belt 100 against the first cylindrical surface 46 which causes the first link 12 to rotate thus changing the angle with the line 34 (since the first cylindrical surface 46 is relatively static). The change of angle caused by the rotation of the first link 12 about the first pivot 24 changes the angular positioning between the drive wheel 60 and the first pulley surface 72. As a result the mechanical reduction is not equal to the simple multiple of the ratios of the circumferences of the pairs of pulleys contributing to the total mechanical reduction.

As the first post 76 is moved along with the distal end portion 16 of the first link 12, a force is exerted via the fourth belt 114 causing the third housing 102 to rotate along with the dual end effector structure 32. The sizes of the various pulleys and cylindrical surfaces are controlled so as to provide that the angles of the links 12 and 18 with the line 34 remain equal and that the angle between the links 12 and 18 varies twice as do the angles between the links 12 and 18 and the line 34. This provides a required straightline radial movement for the third pivot axis 28.

Note that for efficient use of the two hands 35,37 it is necessary that the first link 12, the second link 18 and the dual end effector structure 32 be moveable one over the other and over the first pivot axis 24 so that, for example, the position shown in FIG. 1 can be reversed efficiently over the first pivot axis 24. Also in accordance with the present invention additional motor means 144 must be present for rotating the relatively static structure 38 whereby both r and o motion is possible within a plane. The availability of this r and o motion, along with the moveability of the dual end end effector structure 32 and the links 12 and 18 over one another and over the first pivot axis 24, allows the use of both of the hands 35,37.

Motor means 146 can be present for moving the relatively static structure 38 along or parallel to the first pivot axis 24 whereby Z motion can be provided. All such motions are generally present in robotic arms such as those used for positioning silicon wafers, hard computer discs and the like.

Figure 4A:
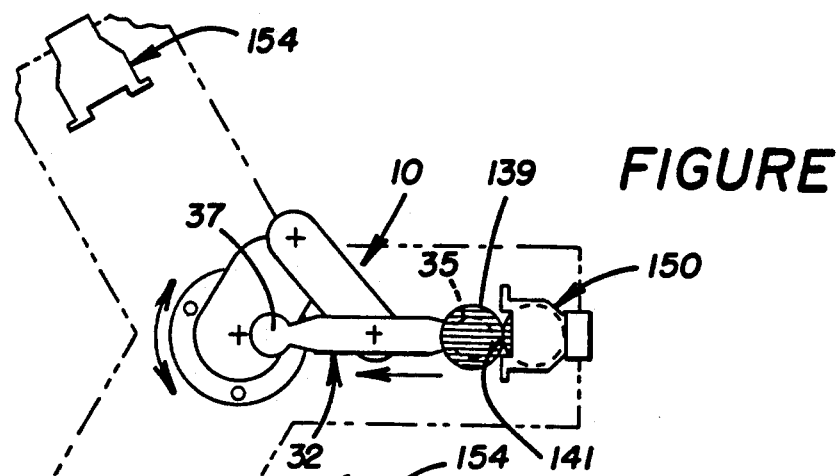
FIGS. 4A, 4B and 4C are schematic views illustrating operation of an arm structure in accordance with an embodiment of the present invention.
Figure 4B:
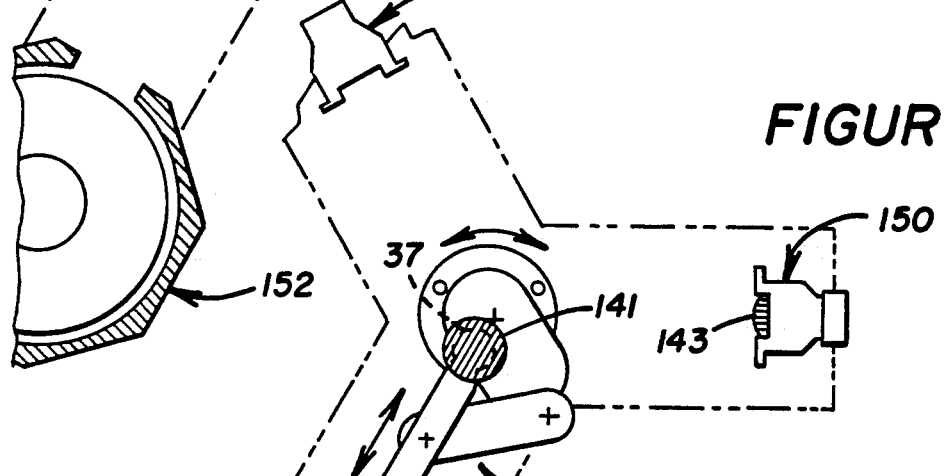
Figure 4C:
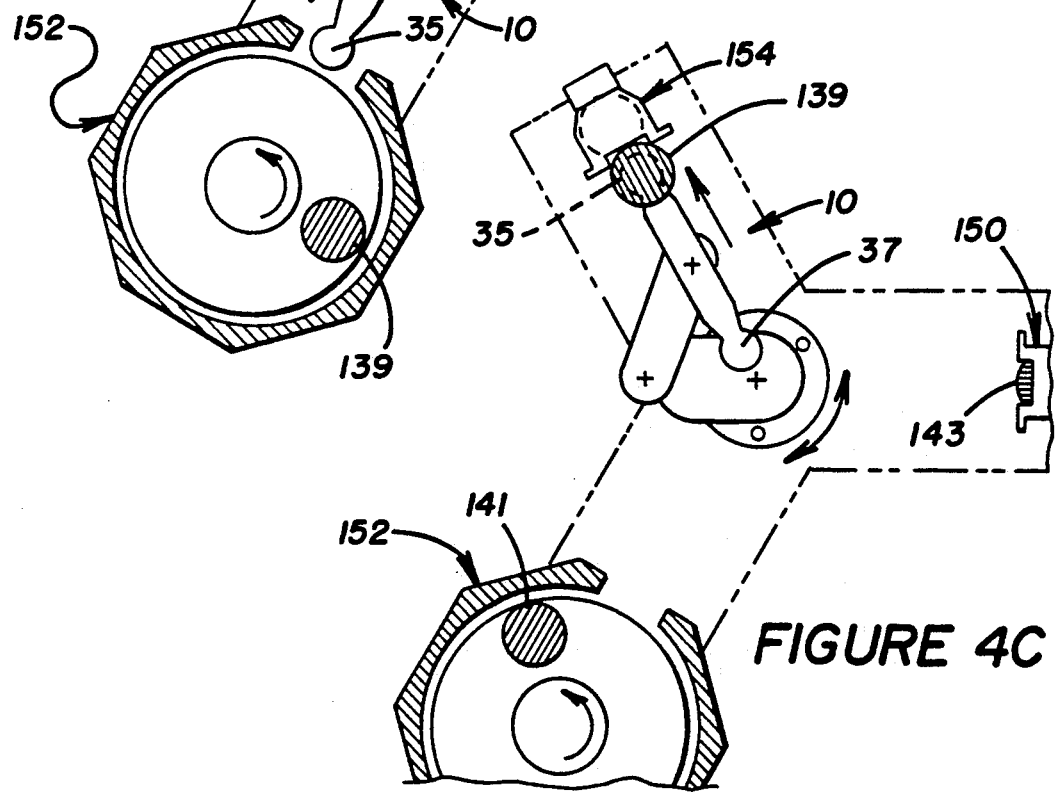

FIGS. 4A, 4B and 4C illustrate operation of an embodiment of the present invention. A workpiece 139 (FIG. 4A) is picked up by hand 35 of dual end effector structure 32 from a delivery cassette 150, for example, using suction delivered by flexible conduit 43. The hand 35 then deposits the workpiece 139 at a work station 152. While the workpiece 39 is being processed at work station 152 the hand 37 (or the hand 35), with appropriate movement of the arm structure 10, picks up a second workpiece 141 from the cassette 150, for example, using suction delivered by flexible conduits 43. The arm structure 10 then positions the hand 35 (or 37) in position to pick up the workpiece 139 from the work station 152 (see FIG. 4B). When processing is complete at work station 152 the hand 35 (or 37) picks up the workpiece 139, rotates and reverses, deposits workpiece 141 and then delivers workpiece 139 to a receiving cassette 154 (see FIG. 4C) (or to another work station (not shown)). Then hand 35 or hand 37 picks up a third workpiece 143, assumes the position of FIG. 4B, and the process continues. The motion is conventionally computer controlled so as to assure that flexible conduits 43 are not fouled by over rotating in a single direction. Application of suction to the conduits 43 is also conventionally computer controlled.

INDUSTRIAL APPLICABILITY

The present invention provides embodiments of arm structures 10 which are useful for moving semiconductor wafers, computer hard discs, or other articles from one position to another in a radial direction for processing, loading, unloading, and the like. Such arm structures 10 are used along with motors which provide and Z movement, as necessary.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known That which is claimed is:

1. A robotic arm, comprising:
   a plurality of sequential pivotally attached links each having proximal and distal end portions, with the proximal; end portion of each link except a proximalmost of said links being pivotally attached relative top the distal end portion of the proceeding link, each of said links being pivotable about a respective axis parallel to that of each other of said links;
   a relatively static structure to which the proximal end portion of the proximalmost of said links is pivotally mounted about an axis parallel to the pivot axes of said links;
   an end effector structure having a central portion and two substantially oppositely extending hands each capable of picking up a workpiece, said central portion being centrally pivotally mounted to the distal end portion of a distalmost of said links for pivoting about an axis parallel to the pivot axes of said links;
   said links, end effector structure and static structure being of a construction sufficient to allow said links and said end effector structure to reverse across and pass through the pivot axis of said proximal end portion of the proximalmost of said links;
   radial drive means for driving said links in a manner such that the pivot axis of said central portion of said end effector structure moves only substantially linearly radially along a line passing through and perpendicular to said pivot axis of said proximal end portion of the proximalmost of said links and to the pivot axis of said central portion of said end effector structure and said end effector structure is maintained at a selected angle to said line; and
   rotational drive means for rotating said relatively static structure and with it said links about the pivot axis of said proximal end portion of said proximalmost of said links.

2. A robotic arm as set forth in claim 1, wherein said selected angle is zero degrees.

3. A robotic arm as set forth in claim 2, wherein said radial drive means comprises a plurality of pulleys and belts.

4. A workpiece processing apparatus, comprising:
   a workpiece holder adapted to hold a plurality of workpieces to be processed;
   a work station adapted to hold and process successively held workpieces;
   a workpiece receiver adapted to receive successively processed workpieces;
   a robotic arm, comprising:
   a plurality of sequentially pivotally attached links each having proximal and distal end portions, with the proximal end portion of each link except a proximalmost of said links being pivotally attached relative to the distal end portion of the preceding link;
   a relatively static structure to which the proximal end portion of the proximalmost of said links is pivotally mounted;
   an end effector structure having a central portion and two substantially oppositely extending hands each capable of picking up a workpiece, said central portion being centrally pivotally mounted to the distal end portion of a distalmost of said links;
   said links, end effector structure and static structure being of a construction sufficient to allow said robotic arm to reverse across the pivot axis of said proximal end portion of the proximalmost of said links;
   radial drive means for driving said links in a manner such that the pivot axis of said central portion of said end effector structure moves only substantially linearly radially along a line passing through and perpendicular to said pivot axis of said proximal end portion of the proximalmost of said links and to the pivot axis of said central portion of said end effector structure and said end effector structure is maintained at a selected angle to said line; and
   rotational drive means for rotating said relatively static structure and with it said links about the pivot axis of said proximal end portion of said proximalmost of said links;
   said robotic arm being positioned and of a construction sufficient to remove successive workpieces from said holder using either of said hands, position said workpieces successively at said work station using either of said hands, remove said workpieces successively from said work station using either of said hands and position said workpieces successively in said receiver using either of said hands.

5. An apparatus as set forth in claim 4, wherein said workpieces comprise semiconductor wafers.

6. An apparatus as set forth in claim 4, wherein said selected angle is zero degrees.

7. An apparatus as set forth in claim 6, wherein said radial drive means comprises a plurality of pulleys and belts.

8. A method of processing workpieces, comprising:
   (A) picking up an unprocessed workpiece holder in one of two hands of a robotic arm comprising:
   a plurality of sequentially pivotally attached links each having proximal and distal end portions, with the proximal end portion of each link except a proximalmost of said links being pivotally attached relative to the distal end portion of the preceding link;
   a relatively static structure to which the proximal end portion of the proximalmost of said links is pivotally mounted;
   an end effector structure having a central portion and two substantially oppositely extending hands each capable of picking up a workpiece, said central portion being centrally pivotally mounted to the distal end portion of a distalmost of said links;
   said links, end effector structure and static structure being of a construction sufficient to allow said robotic arm to reverse across the pivot axis of said proximal end portion of the proximalmost of said links;
   radial drive means for driving said links in a manner such that the pivot axis of said central portion of said end effector structure moves only substantially linearly radially along a line passing through and perpendicular to said pivot axis of said proximal end portion of the proximalmost of said links and to the pivot axis of said central portion of said end effector structure and said end effector structure is maintained at a selected angle to said line; and
   rotational drive means for rotating said relatively static structure and with it said links about the pivot axis of said proximal end portion of said proximalmost of said links;

(B) depositing said unprocessed workpiece at a work station;

(C) processing said workpiece at said work station to provide a processed workpiece;

(D) during said processing: picking up another unprocessed workpiece from the workpiece holder in one of said hands; and positioning the empty one of said hands adjacent said work station in alignment to remove said processed workpiece therefrom;

(E) following said processing: removing said processed workpiece from said work station; reversing said robotic arm to position the unprocessed workpiece in alignment for deposit at said work station; depositing said unprocessed workpiece at said work station; and delivering said processed workpiece to a workpiece receiver; and (F) repeating steps (D) and (E) until a desired number of workpieces have been processed.

9. A method as set forth in claim 8, wherein said workpieces comprise semiconductor wafers.

10. A method as set forth in claim 8, wherein said selected angle is zero degrees.

11. A method as set forth in claim 10, wherein said radial drive means comprises a plurality of pulleys and belts.

* * * * *